US009952569B2

(12) United States Patent
Brissman (10) Patent No.: US 9,952,569 B2
(45) Date of Patent: Apr. 24, 2018

(54) ASSOCIATION OF A PORTABLE SENSOR DEVICE IN A BUILDING MANAGEMENT SYSTEM (71) Applicant: SCHNEIDER ELECTRIC BUILDINGS LLC, North Andover, MA (US)

(72) Inventor: Jan Brissman, Limhamn (SE)

(73) Assignee: SCHNEIDER ELECTRIC BUILDINGS LLC, North Andover, MA (US)

( * ) Notice: Subject to any disclaimer, the term of this patent is extended or adjusted under 35 U.S.C. 154(b) by 311 days.

(21) Appl. No.: 14/395,335

(22) PCT Filed: Apr. 18, 2013

(86) PCT No.: PCT/US2013/037148
§ 371 (c)(1),
(2) Date: Oct. 17, 2014

(87) PCT Pub. No.: WO2013/158866
PCT Pub. Date: Oct. 24, 2013

(65) Prior Publication Data
US 2015/0134085 A1 May 14, 2015

(30) Foreign Application Priority Data
Apr. 19, 2012 (EP) .................... 12164768

(51) Int. Cl.
G05B 15/02 (2006.01)
H04W 4/00 (2009.01)
(Continued)

(52) U.S. Cl.
CPC ............ G05B 15/02 (2013.01); F24F 11/001 (2013.01); F24F 11/0009 (2013.01);
(Continued)

(58) Field of Classification Search
CPC ................ G05D 23/1932; F24F 11/001; F24F 11/0009; F24F 2011/0075; F24F 2221/12;
(Continued)

(56) References Cited

U.S. PATENT DOCUMENTS 6,067,460 A * 5/2000 Alanara ............ H04W 52/0245
455/161.3
6,385,460 B1 * 5/2002 Wan ................... H04W 52/0229
455/434

(Continued)

FOREIGN PATENT DOCUMENTS

GB 2480009 2/2011

OTHER PUBLICATIONS

International Search Report for PCT/US2013/037148, Completed by the U.S. Patent and Trademark Office on Jun. 14, 2013, 2 Pages.
(Continued)

Primary Examiner — Miranda Huang
Assistant Examiner — Olvin Lopez Alvarez
(74) Attorney, Agent, or Firm — Brooks Kushman P.C.

(57) ABSTRACT

There is provided a building management system and a method for associating a portable sensor device with a stationary control device in such a system. Upon detection of a movement of the portable sensor device, the portable sensor device starts to transmit signals more frequently to the stationary control devices. It is determined that the movement of the portable sensor device has stopped if the signal strength of the transmitted signals received at the stationary control devices is essentially constant during a time window. In response to such a determination, the portable sensor device is associated with the stationary control device having the highest received signal strength and the portable sensor device returns to an energy-saving mode.

15 Claims, 6 Drawing Sheets (51) Int. Cl.
    *F24F 11/00*         (2006.01)
    *G05D 23/19*        (2006.01)

(52) U.S. Cl.
    CPC ........ *G05D 23/1932* (2013.01); *H04W 4/008* (2013.01); *F24F 2011/0075* (2013.01); *F24F 2221/12* (2013.01); *G05B 2219/2642* (2013.01); *Y02B 60/50* (2013.01)

(58) Field of Classification Search
    CPC ................. H04W 4/008; G05B 15/02; G05B 2219/2642; Y02B 60/50
    USPC .......................................................... 700/66
    See application file for complete search history.

(56) References Cited

U.S. PATENT DOCUMENTS

| | | | | |
|---|---|---|---|---|
| 7,038,584 | B2 * | 5/2006 | Carter | G01S 5/0036 340/539.13 |
| 7,826,874 | B2 * | 11/2010 | Fyke | H04W 52/0254 340/691.1 |
| 8,787,332 | B2 * | 7/2014 | Ha | H04W 4/02 370/310 |
| 2006/0063523 | A1 | 3/2006 | McFarland | |
| 2007/0139183 | A1 | 6/2007 | Kates | |
| 2008/0240006 | A1 * | 10/2008 | Tseng | H04W 52/0225 370/310 |
| 2008/0242305 | A1 * | 10/2008 | Kahlert | H04W 36/32 455/440 |
| 2008/0285494 | A1 * | 11/2008 | Shin | H04W 52/0229 370/311 |
| 2009/0033513 | A1 | 2/2009 | Salsbury et al. | |
| 2009/0115604 | A1 | 5/2009 | Thomas et al. | |
| 2009/0289845 | A1 * | 11/2009 | Gum | G01S 19/26 342/357.31 |
| 2009/0318140 | A1 * | 12/2009 | Gamel | H04W 36/30 455/432.1 |
| 2010/0113061 | A1 * | 5/2010 | Holcman | G01S 19/34 455/456.1 |
| 2010/0163633 | A1 | 7/2010 | Barrett et al. | |
| 2010/0164787 | A1 * | 7/2010 | Khosravy | G01S 19/25 342/357.25 |
| 2010/0184420 | A1 * | 7/2010 | Reinhold | H04W 60/04 455/418 |
| 2010/0304754 | A1 * | 12/2010 | Czompo | H04W 52/0254 455/456.1 |
| 2010/0304761 | A1 * | 12/2010 | Seibert | H04W 52/0254 455/456.4 |
| 2011/0211511 | A1 | 9/2011 | Bakthavathsalu et al. | |
| 2011/0230201 | A1 | 9/2011 | Hotes et al. | |
| 2012/0086562 | A1 | 4/2012 | Steinberg | |
| 2012/0099495 | A1 * | 4/2012 | Mitra | H04W 52/0235 370/311 |
| 2012/0135728 | A1 * | 5/2012 | Karpoor | H04W 48/16 455/432.1 |
| 2012/0163206 | A1 * | 6/2012 | Leung | G01S 5/0009 370/252 |
| 2013/0029607 | A1 * | 1/2013 | Rosener | H04W 24/10 455/67.7 |
| 2013/0085609 | A1 * | 4/2013 | Barker | G05B 15/02 700/276 |

OTHER PUBLICATIONS

Extended European Search Report for European Application No. EP 12164768.9, Completed by the European Patent Office, dated Oct. 4, 2012, 7 Pages.

Xiao et al. Computer and Information Technology (CIT), 2010 IEEE 10th International Conference, pp. 2222-2227, XP 031757931, "Research on Key Technologies of Building Home Control Based on the Wireless Network".

* cited by examiner

| Control device 104a | |
|---|---|
| Sensor device | Priority |
| 106a | 1 |
| 106b | 2 |
| 108a | 3 |
| Control device 104b | |
| Sensor device | Priority |
| 106a | 1 |
| 106b | 3 |
| 108b | 2 |
| Control device 104c | |
| Sensor device | Priority |
| 106a | 2 |
| 106b | 1 |
| 108c | 3 |

ASSOCIATION OF A PORTABLE SENSOR DEVICE IN A BUILDING MANAGEMENT SYSTEM

CROSS-REFERENCE TO RELATED APPLICATION

This application is the U.S. national phase of PCT Application No. PCT/US2013/037148 filed on Apr. 18, 2013, which claims priority to EP Patent Application No. 12164768.9 filed on Apr. 19, 2012, the disclosures of which are incorporated in their entirety by reference herein.

TECHNICAL FIELD

The present invention relates to the field of building management systems. In particular it relates to association of a portable sensor device with a control device in such a system.

BACKGROUND

Building management systems may for example be used to supervise and control the indoor climate of a building. Such systems may comprise several control devices which are connected in a network. The control devices may receive measurement data from sensors. Further, a user may input reference values (i.e., set point values) to the control devices, for example in the form of a desired temperature.

Such systems may also comprise portable sensor devices which measure parameters, such as temperature. The portable sensor devices are preferably worn by or placed in the vicinity of an occupant of the building and hence measure parameters in the vicinity of the occupant. Further, the occupant may input and store personal settings, such as desired climate parameters in the portable sensor devices.

A general problem with portable sensor devices is that their energy storage is limited since they typically are self-powered or driven by batteries.

US2010/0163633 discloses a control system for a heating, ventilating, and air-conditioning (HVAC) system. The disclosed system comprises controllers in the form of distributed nodes connected in a wireless network. The system further comprises a portable remote control unit by which a user, via a display and a keyboard, may instruct the control system to change a parameter such as a desired temperature in the region where the user is located. The remote control unit may also be docketed with a thermostat. If so, the remote control unit may receive power from the thermostat circuit and communicate with the nodes at a regular two-minute time interval. If not docked, these time intervals are much further spaced in time in order for the remote control unit to conserve power and extend battery life of the remote control unit. A user may bring the portable remote control unit along inside of a building and set a desired temperature as he/she enters a room by pointing the portable remote control unit to one of the controllers of the temperature. Further, in order to indicate that the room is occupied he/she may press a button on the remote control unit.

A drawback with this approach is that the user manually has to perform an action when he/she enters a new room in order to, for example, set a desired temperature value or to indicate that he/she has entered the room. There is thus a need for improvements.

SUMMARY OF THE INVENTION

In view of the above, it is thus an object of the present invention to provide an improved method and a system for associating a portable sensor device with a control device in a building management system when a user for example brings the portable sensor device to another room.

A further object of the invention is to provide a method and a system for associating a portable sensor device with a control device which conserves power of the portable sensor device.

According to a first aspect of the invention, the above object is achieved by a method for associating a portable sensor device with a stationary control device in a building management system comprising a plurality of stationary control devices being connected in a network, and a portable sensor device being associated with one of the stationary control devices, wherein the portable sensor device in a first mode transmits a signal occurring at a first frequency to its associated stationary control device so as to provide its associated stationary control device with sensor data, the method comprising: detecting a movement of the portable sensor device, whereby the portable sensor device changes from the first mode to a second mode in which the portable sensor device transmits a signal occurring at a second frequency being larger than the first frequency; receiving the signal transmitted by the portable sensor device occurring at the second frequency by at least one of the stationary control devices, wherein the received signal at each of the receiving stationary control devices is associated with a received signal strength; determining if the received signal strength of each of the receiving stationary control devices is essentially constant during a time window, thereby determining if the movement of the portable sensor device has stopped; and in case the received signal strength of each of the receiving stationary control devices is essentially constant during a time window, associating the portable sensor device with the stationary control device having the highest received signal strength, whereby the portable sensor device returns to the first mode.

Thereby the movement of the portable sensor device may be followed from the moment the portable sensor device first starts to move until the moment the movement stops. At the outset the portable sensor device is in a first mode being an energy saving mode where it communicates with the control devices at long time intervals.

As the portable sensor device is moved (for example by a user moving the portable sensor device to bring it to another room) movement is detected and the portable sensor device starts to communicate with the control devices at a shorter time interval. In this way, the portable sensor device communicates more often such that the control devices may note that the portable sensor device is moving and such that the movement may be followed.

The movement may be followed by the control devices receiving the signal strength of the signals emitted by the portable sensor device. It is determined that the movement is stopped when the received signal strengths at the control devices is essentially constant during a predefined time window. If it is determined that the movement has stopped, it is assumed that the user probably has reached his/her final destination and the portable sensor device is then associated with the closest (in geographical sense) control device at the destination defined by the control device having the highest received signal strength. In this way, the portable sensor device is automatically associated with a control device as it is brought to another room and hence no manual operations are needed.

When the portable sensor device has been associated with a control device it returns to the first mode where it communicates with its associated control device at long time intervals. In this way, the time period the portable sensor device is in an energy consuming mode is made as short as possible.

By "associating a portable sensor device with a stationary control device" is meant that the stationary control device is set as a host device of the portable sensor device. This implies for example that the stationary control device stores and regularly sends messages to the portable sensor device. Moreover, the portable sensor device sends sensor data to its associated stationary control device to be used by the stationary control device when controlling parameters of the building.

By "a signal occurring at a first/second frequency" is meant that the signal is transmitted at a first/second time interval, the length of the first/second time interval corresponding to the first/second frequency.

By the received signal strengths being "essentially constant" is meant that the variation of the received signal strengths is kept within a user defined tolerance level.

The sensor data may relate to indoor environmental conditions such as heating, ventilation, air-conditioning (HVAC) measurements or settings.

The act of associating the portable sensor device with the stationary control device having the highest received signal strength may further comprise: transmitting control parameters from the portable sensor device to the associated stationary control device. For example, the control parameters may comprise reference values for the stationary control device which are chosen from a set of predefined control parameters. In this way, the portable sensor device may for example provide the stationary control device with personal set point values, such as a desired temperature, to be used in the control.

In one embodiment the portable sensor device, being associated with a first of the stationary control devices, has a time-out functionality. More precisely, the method may further comprise: determining that the portable sensor device is still associated with the first stationary control device after a predetermined time, whereby the portable sensor device returns to the first mode. By letting the portable sensor device return to the first, energy-saving, mode after a predetermined time if it has not been associated with another stationary control device, energy may be saved. Specifically, if it within the predetermined time has not been determined that the received signal strengths are essentially constant during a time window, the portable sensor device is arranged to go back to the energy saving mode. This may for example be useful in a situation where the portable sensor is moved although the user does not have the intention to leave the room permanently.

In some embodiments, the building management system comprises a plurality of portable sensor devices. In such a case it is advantageous that each stationary control device has an order of priority for the sensor data received from the plurality of portable sensor devices. In this way, the stationary control device may use the order of priority to determine which sensor data to use in case the stationary control device is associated with more than one sensor device. The order of priority may further be associated with the type of sensor data such that one portable sensor device has the highest priority for one type of sensor data whilst another portable sensor device has the highest priority for another type of sensor data. In this respect, the sensor data may pertain to, for example, lighting and temperature.

In one embodiment, the portable sensor device being associated with a first stationary control device may temporarily be associated with another stationary control device in case the connection to the first stationary control device is lost. For this reason, the method may further comprise, prior to the act of determining if the received signal strength of each of the receiving stationary control devices is essentially constant during a time window: determining that the received signal strength of the first stationary control device is below a predetermined threshold; associating the portable sensor device with the stationary control device having the highest received signal strength. The predetermined threshold may define a lower limit for when the signal strength is sufficient for communication. This is advantageous in that the portable sensor device is automatically re-associated with another stationary control device when it loses contact with its associated stationary control device.

In one embodiment, the portable sensor device is associated with a first stationary control device, and in the act of determining if the received signal strength of each of the receiving stationary control devices is essentially constant during a first time window, only stationary control devices within a predetermined distance from the first stationary control device are considered. This is advantageous in that processing power is saved since only a subset of the stationary control devices is considered.

According to one embodiment, the method may further be used for the purpose of tracking a portable sensor device. For this purpose, the method may further comprise: storing data relating to signals received by the stationary control devices and their associated signal strengths, and tracking the movement of the portable sensor device based on the stored data by setting the position of the portable sensor device at a time point to the position of the stationary control device having the highest associated received signal strength at the time point. This is advantageous in that a movement of the portable sensor device may be followed. This may for example be useful when a lost portable sensor device is to be located.

According to a second aspect of the invention, the above object is achieved by a building management system comprising: a plurality of stationary control devices being connected in a network; a portable sensor device being arranged to be associated with one of the stationary control devices, wherein the portable sensor device has a first mode in which it is arranged to transmit a signal occurring at a first frequency to its associated stationary control device so as to provide its associated stationary control device with sensor data, and a second mode in which it is arranged to transmit a signal occurring at a second frequency being larger than the first frequency to at least one of the stationary control devices; a motion detector arranged to detect a movement of the portable sensor device, wherein the portable sensor device is arranged to change from the first mode to the second mode upon a detection of a movement, wherein the plurality of control devices are arranged to receive the signal transmitted by the portable sensor device occurring at the second frequency, and wherein the received signal at each of the receiving stationary control devices is associated with a received signal strength; and a processing unit arranged to determine if the received signal strength of each of the receiving stationary control devices is essentially constant during a first time window, thereby being arranged to determine if the movement of the portable device has stopped, to associate the portable sensor device with the stationary control device having the highest received signal strength in case the received signal strength of each of the receiving stationary control devices is essentially constant during a first time window, and to instruct the portable sensor device to return to the first mode.

The second aspect may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. The systems and devices disclosed herein will be described during operation.

Figure 1A:
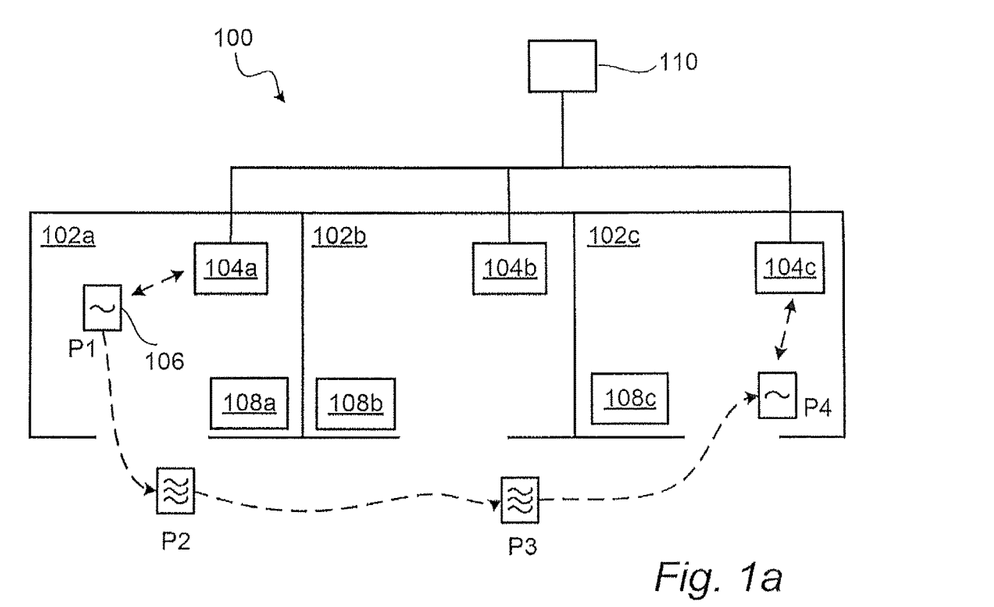
FIGS. 1a, 2a, and 3a schematically illustrate embodiments of a building management system comprising a portable sensor device.

FIG. 1a schematically illustrates a building management system 100 being installed in three rooms 102a-c of a building. The building management system 100 comprises a plurality of stationary control devices 104a-c, a portable sensor device 106, and a processing unit 110. The illustrated building management system 100 also comprises stationary sensor devices 108a-c.

The stationary control devices 104a-c are connected in a wired or wireless network. Preferably, the network is a network based on mesh technology, such as a Zig-Bee network. Each stationary control device 104a-c may communicate with the other stationary control devices 104a-c directly or indirectly via another stationary control device 104a-c. For example, it may be the case that the stationary control device 104a communicates with the stationary control device 104c via the control device 104b. Information regarding how the stationary control devices 104a-c may communicate with each other may be stored in a routing table.

The role of the stationary control devices 104a-c is to control the climate of the building, or other building related parameters. For example the stationary control devices 104a-c may be provided to control heating, ventilation, air-conditioning, lighting etc. There may be more than one stationary control device 104a-c in each room. For example, there may be one stationary control device in a first room which controls temperature, and another stationary control device in said first room which controls ventilation. Since the stationary control devices 104a-c typically are constantly running, they are preferably connected via wire to the power net. In this sense, the stationary control devices 104a-c are stationary.

Each stationary control device 104a-c may be associated with one or more portable and/or stationary sensor devices, such as sensor devices 106 or 108a-c. Here, the stationary control device 104a is associated with the portable sensor device 106 and the stationary sensor device 108a; the stationary control device 104b is associated with the stationary sensor device 108b; and the stationary control device 104c is associated with the stationary sensor device 108c. The current associations of a stationary control device 104a-c may be maintained in a list. Typically, a sensor device 106 or 108a-c is associated with the closest (in geographical sense) stationary control device 104a-c, such as the stationary control device 104a-c being in the same room. The stationary control device 104a-c acts as a host for its associated sensor device 106 or 108a-c. For example, the stationary control device 104a-c may send messages to and store messages to be sent to its associated sensor device 106 or 108a-c.

The sensor devices 106 and 108a-c are arranged to communicate with its associated stationary control device 104a-c. Particularly, at least the portable sensor device 106 is arranged to communicate wirelessly with its associated stationary control device 104a. The wireless communication may be in the radio frequency range and hence the sensors may be provided with radio-based transmitters and receivers and/or transceivers. The sensor devices 106 and 108a-c provide their associated stationary control devices 104a-c with sensor data, such as temperature, carbon dioxide levels, etc., to be used in the control of the building parameters. The sensor data may also comprise control parameters such as user defined reference values. For example, the user defined reference values may be a desired (set point) temperature.

Typically, there is one stationary sensor device 108a-c in each room. As noted above, the stationary sensor devices 108a-c are typically wired to the power net. This is in contrast to the portable sensor device 106 which has access to a limited amount of energy storage, for example provided in the form of a battery. An advantage of having a portable sensor device 106 is that the user may bring the portable sensor device 106 along such that e.g. the climate in another room may be controlled according to the user's preferences by means of the portable sensor device 106 communicating with the stationary control device 104a-c in the room the portable sensor device 106 currently being located in, as will be further disclosed below.

The portable sensor device 106 may operate in two modes. In a first mode the portable sensor device 106 is arranged to communicate with its associated stationary control device 104a by transmitting signals occurring at a first frequency to its associated stationary control device 104a. There is hence a first time interval between consecutive transmittals of the signals in the first mode. For example, the portable sensor device 106 may be arranged to transmit a signal in the order of once every five minutes. In between the transmittals the portable sensor device 106 is arranged to be in a sleep mode in order to save energy resources. The transmitted signal may for example comprise sensor data including control parameters. The control parameters may be chosen from a predetermined set of control parameters. The portable sensor device 106 may further comprise different predetermined set of control parameters, each set of control parameters being associated with a particular room 102*a-c* or a particular type of room. For example, there may be one set of control parameters for office rooms and one set of control parameters for meeting rooms.

In a second mode, the portable sensor device 106 is arranged to transmit a signal occurring at a second frequency being higher than the first frequency. For example, the portable sensor device 106 may be arranged to transmit a signal in the order of once every 10 seconds. The signal transmitted in the second mode is intended to be used for following a course of events, such as following a movement of the portable sensor device 106 in order to allow the portable sensor device 106 to be associated with a new stationary control device. This situation typically occurs when a user brings the portable sensor device 106 to another room.

For this reason, the system comprises a motion detector (not shown). Preferably the motion detector is comprised in the portable sensor device 106. Any known type of motion detector may be used for this purpose, such as an electrical or optical switch, an accelerometer etc. The portable sensor device 106 is arranged to change from the first mode to the second mode upon a detection of a movement, for example as provided by the motion detector. Optionally, a user of the portable sensor device 106 may manually indicate that he/she is moving, e.g. by pressing a button on the portable sensor device 106. The portable sensor device 106 is arranged to, as a result thereof, start transmitting a signal more often (in comparison to the first mode) when a user moves the portable sensor device 106 to for example move to another room.

The signal transmitted by the portable sensor device 106 in the second mode may be received by at least one of the control devices 104*a-c*. The received signal at each of the receiving stationary control devices is associated with a received signal strength. The received signal strengths are indicative of the distances between the portable sensor device 106 and each of the stationary control units 104*a-c*.

The processing unit 110 is arranged to communicate with the network of stationary control devices 104*a-c*. Alternatively, the processing unit 110 is included in one of the stationary control devices 104*a-c*. The processing unit is arranged to perform processing of data relating to the network of stationary control devices 104*a-c*. In particular the processing unit is arranged to receive and process data related to received signal strength of the signals received by the stationary control devices 104*a-c*, and to associate the portable sensor device with a stationary control device 104*a-c*.

Figure 1B:
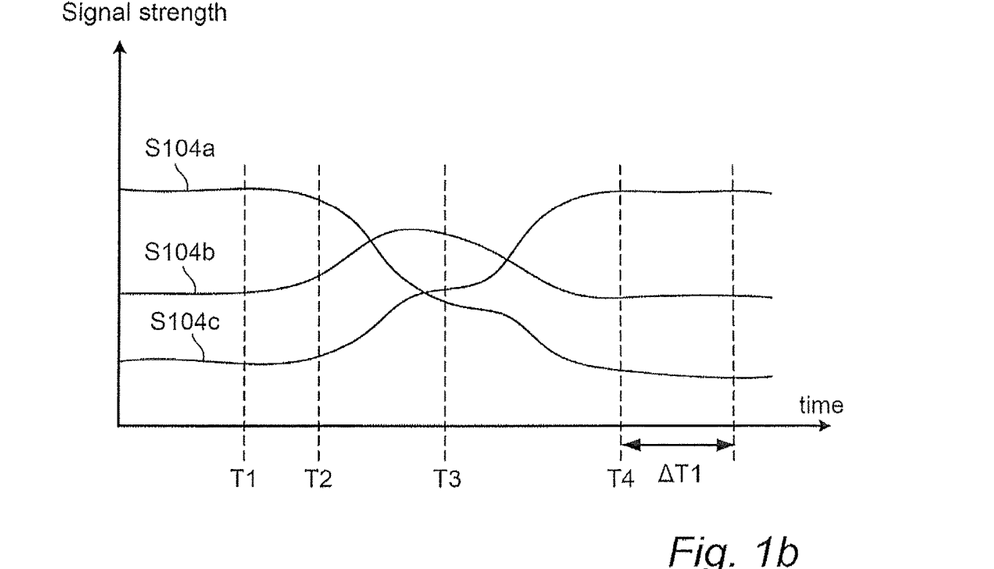
FIGS. 1b, 2b, and 3b schematically illustrate received signal strengths corresponding to the embodiments of FIGS. 1a, 2a and 3a respectively.
Figure 5:
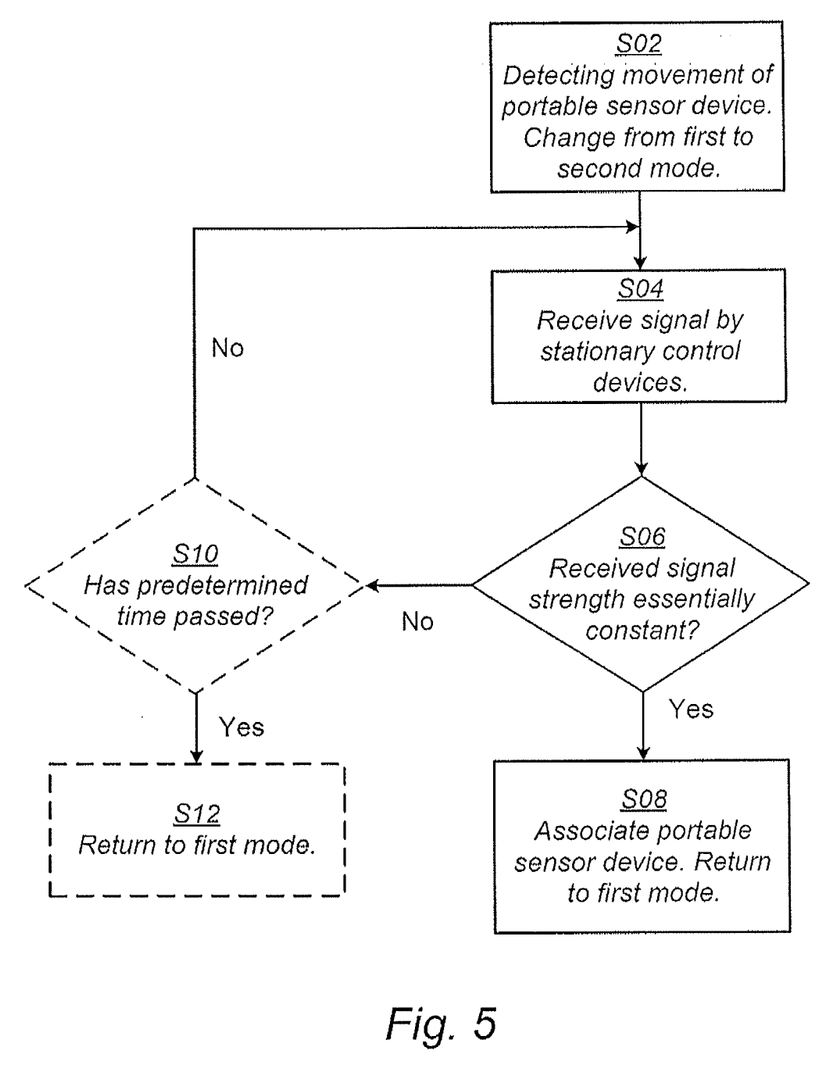
FIGS. 5-6 are flowcharts of methods according to embodiments of the invention.

A first embodiment of a method of the invention will now be described with reference to FIGS. 1*a-b* and the flowchart of FIG. 5. At the outset, the portable sensor device 106 is located at position P1 in room 102*a*. Further, the portable sensor device 106 is associated with the stationary control device 104*a* and is in the first mode, thus being arranged to transmit signals occurring at a first frequency. At time T1, the motion detector detects a movement of the portable sensor device 106 as a user moves the portable sensor device 106 and brings it with him/her to room 102*c*.

In step S02, the movement of the portable sensor device 106 is detected by the motion detector. The movement causes the portable sensor device 106 to change from the first mode to the second mode, thereby causing it to start transmitting signals occurring at the second frequency.

In step S04, the signal transmitted by the portable sensor device 106 in the second mode is received by the stationary control devices 104*a-c*. The received signal strengths S104*a-c* corresponding to stationary control devices 104*a-c*, respectively, are illustrated in FIG. 1*b*. As noted in FIG. 1*b*, at time T1, the received signal strength S104*a* of the stationary control device 104*a* is highest.

As the user carrying the portable sensor device 106 walks out of room 102*a* and walks towards room 102*c*, the received signal strengths S104*a-c* starts to vary as a consequence of the portable sensor device 106 being moved. For example, as the user at time T2 reaches position P2 just outside of room 102*a*, the received signal strength S104*a* at the stationary control device 104*a* decreases at the same time as the received signal strengths S104*b-c* at the stationary control devices 104*b-c* increase. A moment later, at time T3, the user carrying the portable sensor device 106 has reached position P3 outside of room 102*b*. At this time, the received signal strength S104*b* is larger than the signal strengths S104*a* and S104*c*. At time T4, the user (and thus also the portable sensor device 106) reaches his/her final position P4 in room 102*c* and thus stops moving. Consequently, from time T4 and onwards, the received signal strengths S104*a-c* are essentially constant.

In step S06 it is thus determined, for example by the processing unit 110, that the received signal strength of each of the stationary control devices 104*a-c* is essentially constant during a time window ΔT1. In this way the processing unit 110 determines that the movement of the portable sensor device 106 has come to an end. The processing unit 110 may be arranged to base the determination on the received signal strength from all of the stationary control devices 104*a-c*. Alternatively, the processing unit 110 may be arranged to base the determination on the received signal strengths from a subset of the stationary control devices 104*a-c*. For example, the subset may correspond to the stationary control devices being located within a predetermined distance from the stationary control device 104*a* to which the portable sensor device 106 currently is associated. The length of the time window ΔT1 is typically a user defined parameter.

In response to the determination as performed in step S06, the processing unit 110 is arranged to associate in step S08 the portable sensor device 106 with the stationary control device 104*a-c* having the highest received signal strength. In the illustrated example, the stationary control device 104*c* has the highest received signal strength S104*c*. Thus, the processing unit 110 associates the portable sensor device 106 with the stationary control device 104*c*. Having been associated with the stationary control device 104*c* having the highest signal strength 104*c*, the portable sensor device 106 is arranged to return to the first mode. The portable sensor device 106 may further be arranged to transmit control parameters such as reference values to its associated stationary control device 104*c*. Preferably, the control parameters are transmitted prior to the portable sensor device 106 returning to the first mode.

As the portable control device 106 has been associated with the third stationary control device 104*c* in room 102*c* by the processing unit 110 it will no longer be associated with the first stationary control device 104*a* in room 102*a*. This means that the stationary control device 104*a* is no longer arranged to act as a host for or receive sensor data from the portable sensor device 106. In the illustrated example, the stationary control device 104a is however still associated with the stationary sensor device 108a and hence, the stationary control device 104a may use sensor data from the stationary sensor device 108a in its control. The order of priority of sensor data in the case when a stationary control device 104a-c is associated with several sensor devices is further described with respect to FIGS. 4a-b.

According to embodiments of the invention, the method may comprise a time-out functionality. Such an embodiment will now be described with reference to FIGS. 2a-b and the flowchart of FIG. 5.

Figure 2A:
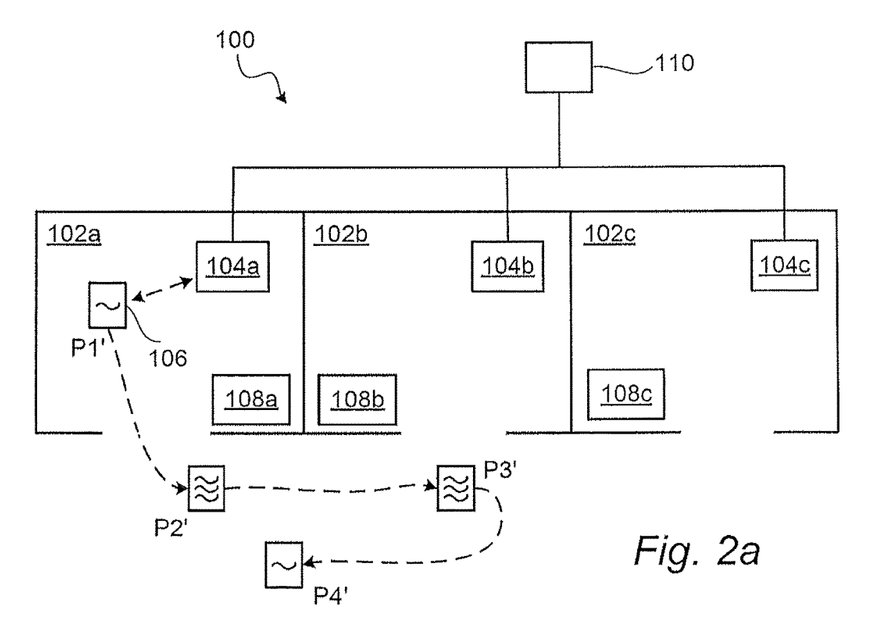

FIG. 2a schematically illustrates the same building management system 100 as disclosed in FIG. 1a. At the outset the portable sensor device 106 is located at position P1' in room 102a. The portable sensor device 106 is in the first mode and is associated with the stationary control device 104a. At time T1' a user moves the portable sensor device 106 and brings it with him/her when he/she is walking over to room 102b to say a few words to his/her colleague located in room 102b.

As disclosed above, in step S02, the movement of the portable sensor device 106 is detected by the motion detector, whereupon the portable sensor device 106 is arranged to change from the first mode to the second mode, thereby being arranged to start transmitting signals occurring at the second frequency.

Figure 2B:
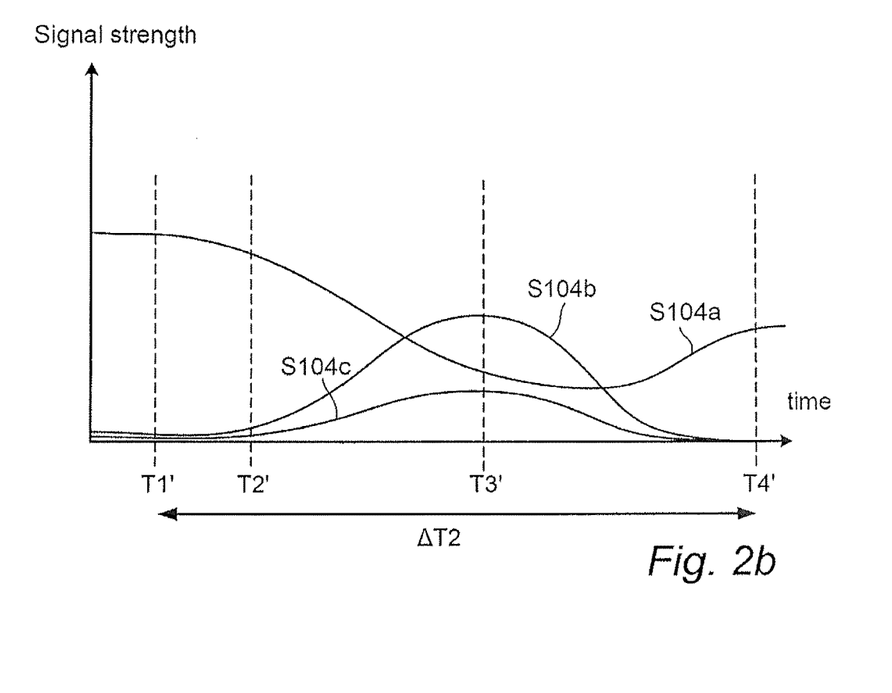

As disclosed above, in step S04, the signal transmitted by the portable sensor device 106 in the second mode is received by the stationary control devices 104a-c. The received signal strengths S104a-c corresponding to stationary control devices 104a-c, respectively, are illustrated in FIG. 2b. At time T1', the received signal strength S104a of the stationary control device 104a is highest, see FIG. 2b.

As the user carrying the portable sensor device 106 walks out of room 102a and walks towards room 102b, the received signal strengths S104a-c starts to vary. For example, as the portable sensor device 106 at time T2' reaches position P2' just outside of room 102a, the received signal strength S104a at the stationary control device 104a decreases at the same time as the received signal strengths S104b-c at the stationary control devices 104b-c increase. At a moment later, at time T3', the portable sensor device 106 has reached position P3' outside of room 102b. At this moment, the received signal strength S104b is larger than the signal strengths S104a and S104c, see FIG. 2b.

Having said a few words to his colleague in room 102b, the user carrying the portable sensor device 106 starts to walk back to his room reaching location P4' at time T4'. Meanwhile, in step S06, as disclosed above, the processing unit 110 is arranged to check whether the received signal strengths 104a-c are essentially constant during a time window ΔT or not. In this case, the received signal strengths 104a-c have not stabilized at constant values, thereby resulting in a negative determination by the processing unit 110.

In response to the negative determination, is the processing unit 110 is in step S10 arranged to determine whether a predetermined time ΔT2 has passed or not. The predetermined time ΔT2 is longer than the duration of the time window ΔT1. In case a predetermined time ΔT2 has passed, meaning that the portable sensor device 106 is still associated with the stationary control device S104a after the predetermined time ΔT2, the portable sensor device 106 is arranged to return to the first mode in step S12. In the illustrated example, the portable sensor device 106 is thus arranged to return to the first mode at time T4'. In this way, it is avoided that the portable sensor device 106 is in the second mode for too long a time, thereby saving energy resources in the portable sensor device 106.

Figure 3A:
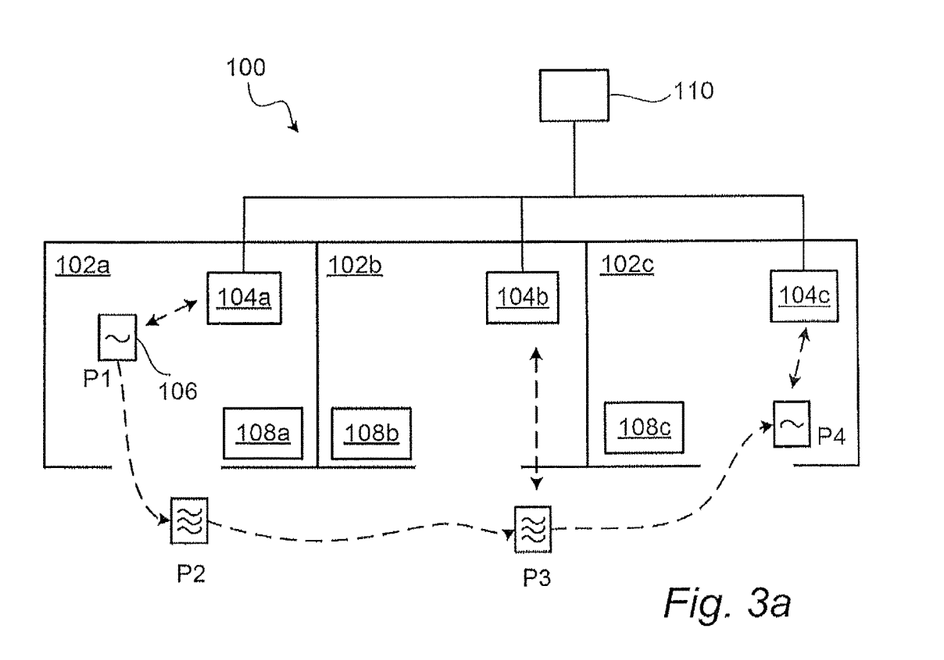
Figure 3B:
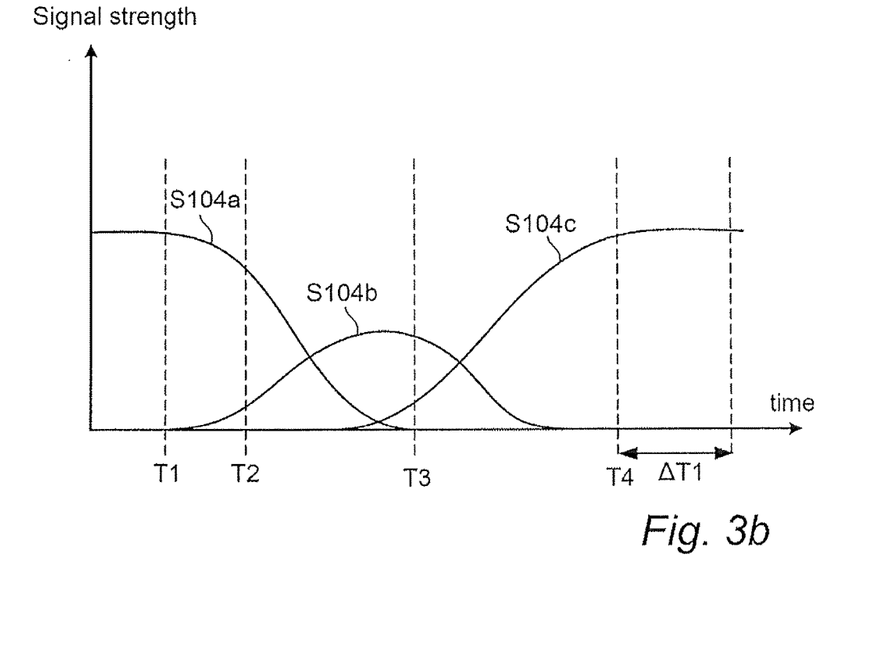
Figure 6:
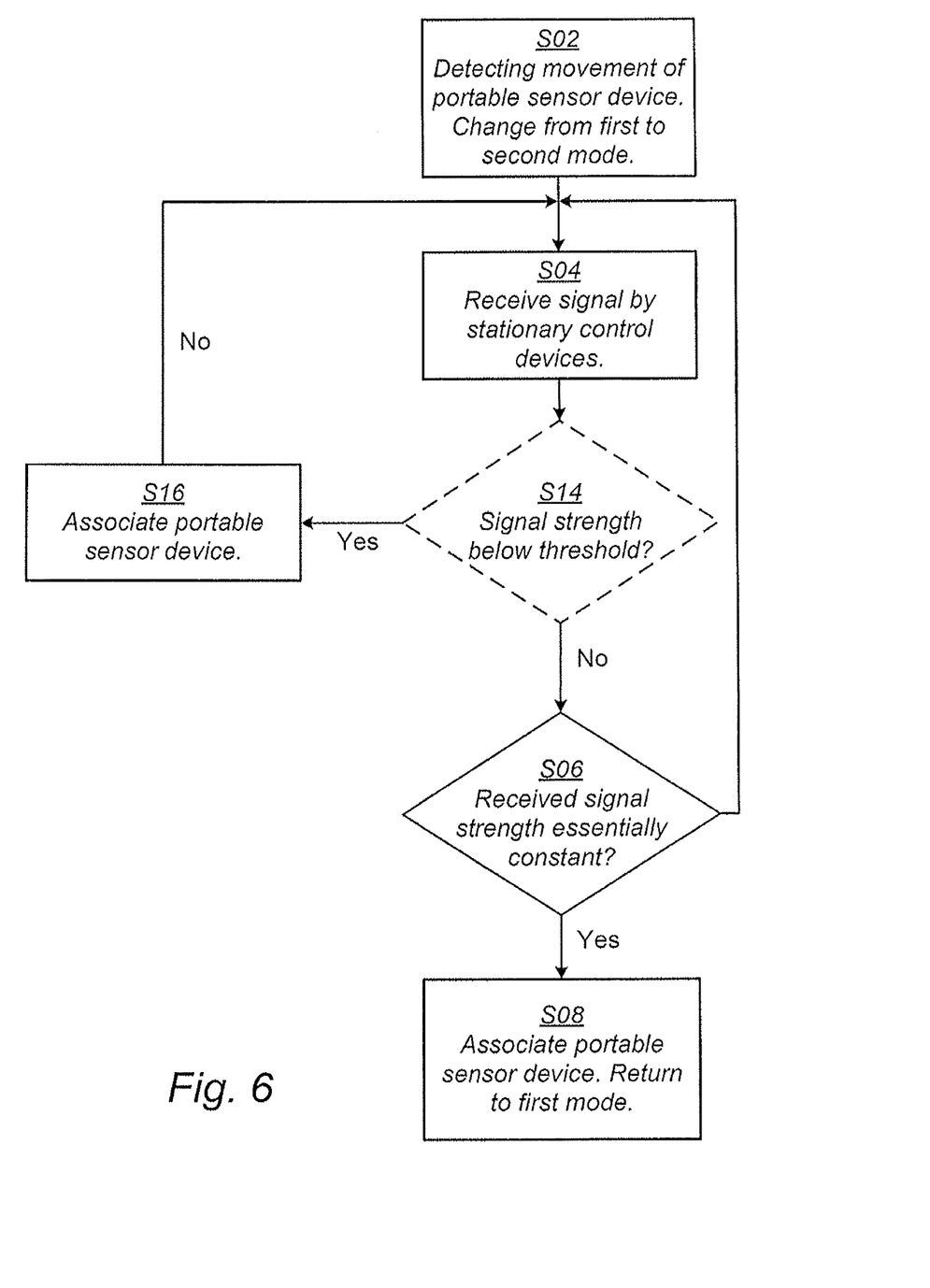

Another embodiment will now be described with reference to FIGS. 3a-b and the flow chart of FIG. 6. FIG. 3a schematically illustrates the same building management system 100 as disclosed in FIG. 1a. The scenario illustrated in FIG. 3a is similar to that of FIG. 1a. The difference is that as the user carrying the portable sensor device 106 reaches position P3 at time T3, the received signal strength S104a at the first stationary control device 104a is below a predetermined threshold for communications (i.e., the signal level is close to or equal to zero), meaning that a signal from the portable sensor device 106 is not received at the first stationary control device 104a.

Therefore, in step S14 the processing unit 110 is arranged to determine that the received signal strength at the stationary control device being associated with the portable control device 106 is below the predetermined threshold for communications, thereby being determined to have "zero" signal strength.

As a result of the determination, the processing unit 110 is in step S16 arranged to associate the portable control device 106 with the stationary control device currently having the highest received signal strength. In the illustrated example, the stationary control device 104b has the highest received signal strength at time T3. Accordingly, the processing unit 110 is arranged to associate the portable control device 106 with the stationary control device 104b whereby the method returns to step S04. It is to be noted that upon association with the stationary control device 104b, the portable control device 106 advantageously does not return to the first mode since the movement of the portable sensor device 106 has not come to an end.

Figure 4A:
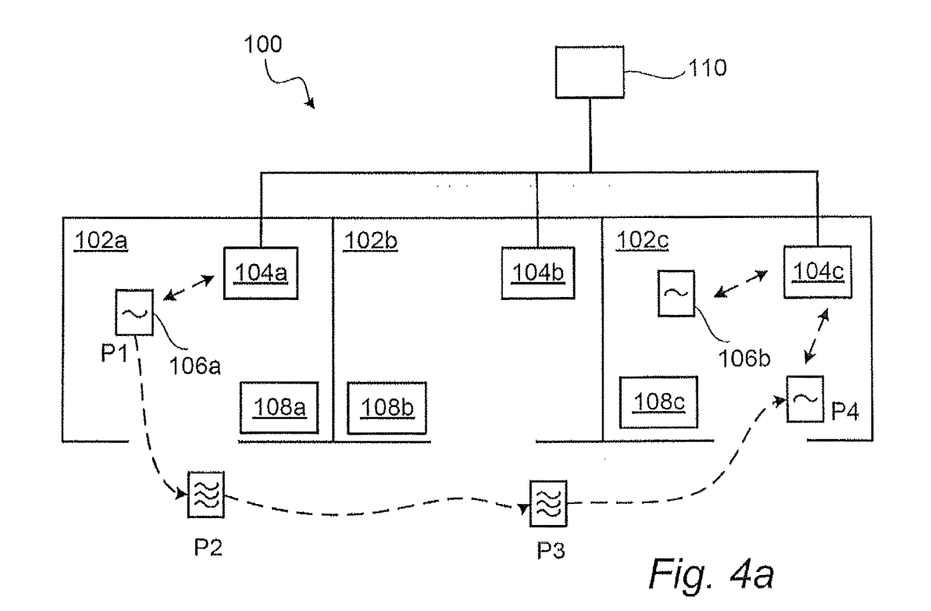
FIGS. 4a-b schematically illustrate a building management system comprising several portable sensor devices and a corresponding table of priorities.
Figure 4B:
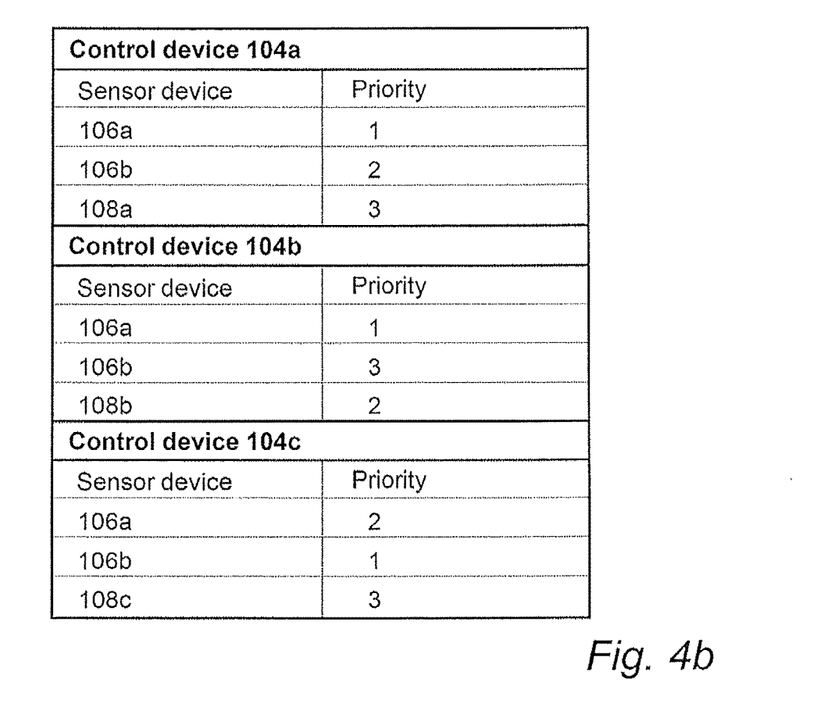

Another embodiment of the invention will now be described with reference to FIGS. 4a-b. FIG. 4a schematically illustrates the same building management system 100 as disclosed in FIG. 1a. FIG. 4a differs from the example of FIG. 1a in that there is a plurality of portable sensor devices 106a-b. Each of the stationary control devices 104a-c may be arranged to be associated with more than one portable or stationary sensor device 106a-b or 108a-c at a time. This means that the stationary control devices 104a-c may be arranged to receive sensor data from more than one portable or stationary sensor device 106a-b or 108a-c at a time. In the illustrated example, the stationary control device 104c is associated with the portable sensor devices 106a-b.

In order for the stationary control devices 104a-c to know which sensor data to use in the control, each stationary control device 104a-c has an order of priority for the sensor data received from the plurality of portable sensor devices 106a-b. The order of priority may also include the stationary sensor devices 108a-c. In the table of FIG. 4b an example of such an order of priority is given. In the example, the stationary control device 104c has the highest priority for the portable sensor device 106b, the second highest priority for the portable sensor device 106a, and the third highest priority for the stationary sensor device 108c. This means for example that sensor data received from the portable sensor device 106b is prioritized over sensor data received from the portable sensor device 106a. Thus, when both portable sensor devices 106a-b are associated with the stationary control device 104c, the sensor data received from the portable sensor device 106b is prioritized in the control by the stationary control device 104a. In practice, in case the portable sensor devices 106a-b are both temperature sensors, the temperature values and the temperature set points from the portable sensor device 106b are used to control the temperature in room 102c.

The order of priority may further be linked to the type of sensor data, such as temperature, carbon dioxide level, lighting preferences etc. In particular, there may be different orders of priority for different types of sensor data. For example, for the stationary control device 104c, the portable sensor device 106b may be prioritized for sensor data relating to temperature, while the stationary sensor device 108c may be prioritized for sensor data relating to carbon dioxide level.

Other ways for the stationary control devices 104a-c to know which sensor data to use in the control may also be relevant. For example the control may be based on using the average of sensor data from several portable sensor devices 106a-b, possibly in combination with sensor data received from the stationary sensor devices 108a-c. Another example is basing the control on using the maximum or minimum of sensor data from several portable sensor devices 106a-b, possibly in combination with sensor data received from the stationary sensor devices 108a-c.

The building management system 100 disclosed in the above embodiments may also be used to track the position of a portable sensor device 106a-c. Particularly, data relating to signals received by the stationary control devices 104a-c and their associated signal strengths may be stored. For example, the data relating to signal strengths may be stored in a memory operatively coupled with the processing unit 110. Based on the stored data, the processing unit 110 may be arranged to track the position of one or more portable sensor devices 106a-b at different time points. For example, the processing unit 110 may be arranged to set the position of the portable sensor device 106a-b at a certain time point to the position of the stationary control device 104a-c having the highest associated received signal strength at the certain time point. For example, with reference to the signal strengths of FIG. 1b, the position of the portable sensor device 106 would in this way be set to the position of the first stationary control device 104a at time points T1 and T2. At time point T3, the position of the portable sensor device 106 would be set to the position of the second stationary control device 104b. Eventually, at time point T4, the position of the portable sensor device would be set to the position of the third stationary control device 104c.

It will be appreciated that a person skilled in the art can modify the above-described embodiments in many ways and still use the advantages of the invention as shown in the embodiments above. For example, the stationary control devices 104a-c may not be the actual controllers but may have the function of relaying sensor data to control devices which carry out the control. There may further be more than one stationary control device 104a-c in each room. For example, there may be one stationary control device for temperature and another for ventilation. If so, the different stationary control devices may have different orders of priority regarding the sensor devices. For example, if the portable sensor device mainly is a temperature sensor, it may have a high priority for the stationary temperature control device but a low (or zero) priority for the other stationary control devices. Thus, the invention should not be limited to the shown embodiments but should only be defined by the appended claims. Additionally, as the skilled person understands, the shown embodiments may be combined.

The invention claimed is:

1. A method for associating a portable sensor device with a stationary control device in a building management system comprising a plurality of stationary control devices being connected in a network, and the portable sensor device being associated with one of the stationary control devices, the method comprising:
   transmitting, by the portable sensor device when in an energy saving mode, a signal occurring at a first frequency to a first stationary control device to which the portable sensor device is associated so as to provide the first stationary control device with sensor data;
   detecting, by a motion detector within the portable sensor device, a movement of the portable sensor device, whereby the portable sensor device changes from the energy saving mode to an energy consuming mode in which the portable sensor device transmits a signal occurring at a second frequency being larger than the first frequency;
   receiving the signal transmitted by the portable sensor device occurring at the second frequency by the plurality of stationary control devices, wherein the received signal at each of the receiving stationary control devices is associated with a received signal strength;
   determining if the received signal strength of each of the receiving stationary control devices is essentially constant during a time window, thereby determining if the movement of the portable sensor device has stopped; and
   in case the received signal strength of each of the receiving stationary control devices is essentially constant during a time window, associating, by a processing unit which is separate from the portable sensor, the portable sensor device with the stationary control device having the highest received signal strength, whereby the portable sensor device returns to the energy savings mode, whereby the portable sensor device returns to the energy saving mode in which the portable sensor device transmits a signal occurring at the first frequency to the second stationary control device to which the portable sensor device is associated so as to provide the second stationary control device with sensor data.

2. The method of claim 1, wherein the sensor data relates to indoor environmental conditions such as heating, ventilation, air-conditioning measurements or settings.

3. The method of claim 1, wherein the act of associating the portable sensor device with the second stationary control device having the highest received signal strength further comprises:
   transmitting control parameters from the portable sensor device to the associated stationary control device.

4. The method according to claim 3, wherein the control parameters comprise reference values for the stationary control device being chosen from a set of predefined control parameters.

5. The method of claim 1, further comprising:
   determining that the portable sensor device is still associated with the first stationary control device after a predetermined time, whereby the portable sensor device returns to the energy saving mode.

6. The method of claim 1, wherein the building management system comprises a plurality of portable sensor devices, and wherein each stationary control device has an order of priority for the sensor data received from the plurality of portable sensor devices.

7. The method of claim 1, prior to the act of determining if the received signal strength of each of the receiving stationary control devices is essentially constant during a time window:

determining that the received signal strength of the first stationary control device is below a predefined threshold;

associating the portable sensor device with the stationary control device having the highest received signal strength.

8. The method of claim 1, wherein in the act of determining if the received signal strength of each of the receiving stationary control devices is essentially constant during a first time window, only stationary control devices within a predetermined distance from the first stationary control device are considered.

9. The method of claim 1, further comprising
storing data relating to signals received by the stationary control devices and their associated signal strengths,
tracking the movement of the portable sensor device based on the stored data by setting the position of the portable sensor device at a time point to the position of the stationary control device having the highest associated received signal strength at the time point.

10. A building management system, comprising
a plurality of stationary control devices being connected in a network;
a portable sensor device being arranged to be associated with one of the stationary control devices, wherein the portable sensor device is arranged to transmit, when in an energy saving mode, a signal occurring at a first frequency to a first stationary control device to which it is associated so as to provide the first stationary control device with sensor data;
a motion detector arranged within the portable sensor device to detect a movement of the portable sensor device, wherein the portable sensor device is arranged to change from the energy saving mode to an energy consuming mode upon a detection of a movement, wherein, when in the energy consuming mode, the portable sensor device is arranged to transmit a signal occurring at a second frequency being larger than the first frequency;
wherein the plurality of stationary control devices are arranged to receive the signal transmitted by the portable sensor device occurring at the second frequency, and wherein the received signal at each of the receiving stationary control devices is associated with a received signal strength; and
a processing unit which is separate from the portable sensor device and which is arranged to determine if the received signal strength of each of the receiving stationary control devices is essentially constant during a first time window, thereby being arranged to determine if the movement of the portable device has stopped, to associate the portable sensor device with a second stationary control device instead of the first stationary control device, the second stationary control device being the stationary control device having the highest received signal strength, in case the received signal strength of each of the receiving stationary control devices is essentially constant during a first time window, and to instruct the portable sensor device to return to the energy saving mode, whereby the portable sensor device is arranged to transmit a signal occurring at the first frequency to the second stationary control device to which it is associated so as to provide the second stationary control device with sensor data.

11. The building management system of claim 10, wherein the portable sensor device further is arranged to transmit control parameters to its associated stationary control device prior to returning to the energy saving mode.

12. The building management system of claim 10, wherein the processing unit is further arranged to determine that the first stationary control device is still associated with the first stationary control device after a predetermined time, and to instruct the portable sensor device to return to the energy saving mode in response to the determination.

13. The building management system of claim 10, further comprising several portable sensor devices, wherein each stationary control device has an order of priority for the sensor data received from the plurality of portable sensor devices.

14. The building management system of claim 10, wherein the processing unit is further arranged to store data relating to signals received by the stationary control devices and the associated signal strengths, and to tracking the movement of the portable sensor device based on the stored data by setting the position of the portable sensor device at a time point to the position of the stationary control device having the highest associated received signal strength at the time point.

15. The building management system of claim 10, wherein the processing unit further is arranged to, prior to the act of determining if the received signal strength of each of the receiving stationary control devices is essentially constant during a first time window: determine that the received signal strength of the first stationary control device is equal to zero; and to associate the portable sensor device with the stationary control device having the highest received signal strength.

* * * * *

UNITED STATES PATENT AND TRADEMARK OFFICE
CERTIFICATE OF CORRECTION

PATENT NO. : 9,952,569 B2
APPLICATION NO. : 14/395335
DATED : April 24, 2018
INVENTOR(S) : Jan Brissman et al.

Page 1 of 1

It is certified that error appears in the above-identified patent and that said Letters Patent is hereby corrected as shown below:

In the Claims

Column 12, Lines 33-34, Claim 1:
After "device returns to the energy savings mode"
Delete "whereby the portable sensor device returns to the energy saving mode" (second occurrence)

Signed and Sealed this
Eighteenth Day of September, 2018

Andrei Iancu
*Director of the United States Patent and Trademark Office*